(12) United States Patent
Hough

(10) Patent No.: US 6,390,624 B1
(45) Date of Patent: May 21, 2002

(54) CONTACT LENS

(75) Inventor: Denis A. Hough, Eaton Socon (GB)

(73) Assignee: No.7 Contact Lens Laboratory Limited, London (GB)

( * ) Notice: Subject to any disclaimer, the term of this patent is extended or adjusted under 35 U.S.C. 154(b) by 0 days.

(21) Appl. No.: 09/485,150

(22) PCT Filed: Aug. 7, 1998

(86) PCT No.: PCT/GB98/02379

§ 371 Date: Apr. 17, 2000

§ 102(e) Date: Apr. 17, 2000

(87) PCT Pub. No.: WO99/08147

PCT Pub. Date: Feb. 18, 1999

(30) Foreign Application Priority Data

Aug. 7, 1997 (GB) .............................................. 9716793

(51) Int. Cl.$^7$ .............................. G02C 7/02; G02C 7/04
(52) U.S. Cl. .................................... 351/177; 351/160 R
(58) Field of Search ............................ 351/161, 160 R, 351/160 H, 162, 177

(56) References Cited

U.S. PATENT DOCUMENTS

| | | | | |
|---|---|---|---|---|
| 5,436,678 A | * | 7/1995 | Carroll | 351/161 |
| 5,517,260 A | * | 5/1996 | Glady et al. | 351/169 |
| 5,652,638 A | * | 7/1997 | Roffman et al. | 351/161 |
| 5,771,088 A | * | 6/1998 | Perrott | 351/161 |
| 5,790,231 A | * | 8/1998 | Mercier | 351/161 |
| 5,835,187 A | * | 11/1998 | Martin | 351/161 |
| 5,864,379 A | * | 1/1999 | Dunn | 351/161 |

* cited by examiner

*Primary Examiner*—Jordan M. Schwartz
(74) *Attorney, Agent, or Firm*—Pearne & Gordon LLP

(57) ABSTRACT

The invention provides a rigid contact lens which acts as a varifocal device when worn on a specified eye in which the varifocal functionality is obtained from the geometry of the back surface of the lens. A process for the manufacture of such a rigid contact lens is also provided together with a process for shaping the back surface of such a rigid contact lens and rigid contact lens blank having a back surface prepared by such a process.

13 Claims, 5 Drawing Sheets

CONTACT LENS

FIELD OF INVENTION

This invention relates to a rigid contact lens which acts as a varifocal device when worn on a specified eye, a process for the manufacture of such a rigid contact lens, a process for shaping the back surface of such a rigid contact lens and a rigid contact lens blank having a back surface prepared by such a process.

BACKGROUND OF THE INVENTION

Presbyopia is a condition of advancing age in which the ability to focus on near objects, such as newsprint, is diminished. Presbyopes require reading glasses and such reading glasses always have positively powered lenses. Presbyopia is an advancing condition in that, at first, presbyopes require small additional amounts of positive power but this requirement increases with advancing age. The condition typically becomes noticeable then about +0.75 dioptres of additional power is required to read. The amount of extra power required for reading correction is commonly referred to as the "reading addition" in spectacle prescriptions.

Presbyopia affects the entire population. However, a presbyope may already be wearing spectacles or contact lenses to correct another vision defect, such a myopia. In such cases, spectacles or contact lenses will be required which are capable of correcting both types of vision defect.

Bifocal lenses are known which have two clearly delineated segments, one correcting distance vision and one correcting near vision, and this type of lens has been utilised to produce bifocal spectacles and bifocal contact lenses.

Similarly, multifocal lenses are known which have two or more clearly delineated segments. Thus, in spectacles, it is reasonably common to have lenses which correct for distance, near and intermediate vision and such multifocal lenses are often worn by workers such as VDU operators who are frequently required to operate at all these distances.

Varifocal lenses are also known in the context of spectacles which are designed to correct presbyopia but do not have clearly delineated segments.

The surface of a contact lens which sits on the eye when the lens is worn is known as the back surface and all rigid lens design classification is based on the arrangement of the back surface parameters. Thus, lenses which have back surfaces derived from spheres are broadly referred to as "spherical" and lenses which include non-spherical zones are broadly described as "aspheric".

The back surface of a contact lens can be divided into two distinct zones. The first zone, which is centrally located, is referred to as the back central optic zone and it is through this zone that the lens-wearer sees. The second zone surrounds the back central optic zone and determines the lens-cornea relationship, that is, how the lens sits on the eye and how it behaves dynamically. This zone is referred to as the peripheral zone and the associated radius and diameter are known as the peripheral zone radius and peripheral zone diameter. Often, a lens will have more than one contiguous peripheral zone, each peripheral zone having its own associated peripheral zone radius and peripheral zone diameter. Areas of the back central optic zone which lie away from the axis of the lens are referred to as marginal zones and the portion of the back central optic zone which would be used by a normally dilated pupil is referred to as the effective optic zone.

Spherical aberration is a natural aspect of spherical optical lenses in which rays of light close to the lens axis (the paraxial region) focus at a slightly different place to marginal rays. FIG. 1 shows a convex (positive) lens in which the paraxial incident ray p focuses at fp and a marginal ray m focuses at a shorter distance from the back vertex of the lens at fm. Rays which are incident between p and m will focus in between. The lens will therefore not have a single point of focus but a "blur circle". A positive lens has a "real" focal length and positive spherical aberration, that is, as the incident ray moves away from the centre, the power of the surface becomes increasingly positive.

FIG. 2 shows the spherical aberration of a negatively powered lens in a similar fashion to FIG. 1. A negative lens has a "virtual" focal length and negative spherical aberration, that is, as the incident ray moves away from the centre, the power of the surface becomes increasingly negative.

The cornea and the eye may for many purposes of optical analysis be considered as a single optical element and that convention will be used here. The cornea is itself subject to positive spherical aberration as shown in FIG. 3. Thus, marginal rays focus in front of paraxial rays. However, the extent of corneal spherical aberration varies between individuals and depends on the shape and size of the cornea.

During the early 1990s, an instrument called the videokeratoscope has developed very rapidly due to impetus from the rapid development of the personal computer and, at the same time, the very rapid development of corneal surgery using lasers where it is vital to monitor detailed changes in corneal topography before and after the surgical procedure. The videokeratoscope measures the topography of a patient's cornea over approximately the central 10 mm by shining bright concentric circles, known as a "Placido disk", on the eye and measuring the reflected light. The algorithms used to calculate the corneal topography are known as "reconstruction algorithms" and are highly computing intensive hence the recent advances as personal computers have greatly increased the speed at which they can perform large volumes of complex calculations.

Various studies have shown that the average human cornea is well-modelled by means of a general ellipsoid, particularly over the central 10 mm. Ellipsoids can be specified mathematically in terms of vertex radius and numerical eccentricity. The videokeratoscope can determine the values of vertex radius and numerical eccentricity which will most closely describe the cornea being measured. Thus, it can determine the central corneal curvature and also the shape of the eye. The availability of the videokeratoscope in clinical practice has therefore provided a reliable means of measuring the key parameters of central corneal topography.

When a rigid contact lens is placed on the eye, it is normal to have a small layer of tears form between the back surface of the lens and the front surface of the cornea. From the above discussion, it is evident that the combined optical system of lens, tears and cornea will also have spherical aberration but that the amount will depend on the power of the lens, the lens-cornea relationship and the shape of the cornea.

If a patient who has normal corneal topography is wearing a positively powered contact lens, there will often be significant positive spherical aberration within a diameter corresponding to a normally-dilated pupil, because the positive spherical aberration of the lens will add to the positive spherical aberration of the cornea. Such a situation is shown schematically in FIG. 4. On the other hand, if a patient having normal corneal topography is wearing a negatively powered lens, there may be little or no combined spherical aberration in some cases because the negative spherical aberration of the lens will reduce or cancel out the positive spherical aberration of the cornea.

The present invention is based on the premise that, if the spherical aberration of the combined optical system of lens, tears and cornea could be engineered so that the power in the centre corrected the patient's distance vision and the marginal power at a defined distance from the centre corrected the patient's near vision, then the lens would function as a varifocal device if the on-eye dynamics of the lens were such that, when the patient looked down, the lens moved or "translated" so that the line of sight was through the part of the lens that was powered for the patient's reading correction.

It is normal to fit rigid lenses so that there is movement relative to the cornea during normal eye movements such as blinking or looking sideways. The required translation effect would be enhanced by this as rigid lenses tend to ride up when the wearer gazes down thus shifting the line of sight to a marginal zone.

U.S. Pat. No. 5,493,350 teaches the use of a concave posterior surface having a standardised eccentricity which in certain cases can act as a multifocal device, provided that the lens can be repositioned during downgaze. However, due to the variability of corneal topography and the natural variation in patient population distance correction, the approach taught in U.S. Pat. No. 5,493,350 will be anomalous in its functionality. In other words, this approach will necessarily have a "hit and miss" characteristic, depending on the patient's distance correction and their corneal topography. Moreover, by relying on a standardised eccentricity, the approach taught by U.S. Pat. No. 5,493,350 will in many cases require the practitioner to fit lenses which do not have what would generally be regarded as a normal lens-cornea relationship thereby creating potential problems for the wearer in the long term. Indeed, the need to reposition the lens to obtain the reading addition is the subject of much of the detail in U.S. Pat. No. 5,493,350 whereas the important influence of the tear layer which functions as an optical element is not even discussed.

GB-A-2192291 teaches the use of a spherical central optic zone to provide distance vision surrounded by a peripheral zone of progressive power, which is described as "aspheric" but, in fact, comprises a zone of offset, or displaced, spherical curvature which has its centre of rotation away from the lens axis. It is asserted that the reading addition can be changed by altering the axial edge lift of the lens which would generate a different offset peripheral curve. However, GB-A-2192291 takes no account of the cornea as an optical element. Moreover, the lens described would require very substantial translation to place the pupil in line with a zone of reasonable reading addition.

GB-A-2139375 describes a varifocal soft contact lens intended to provide distance vision through the centre and having increasing positive power away from centre. The complete power range is designed to be contained within a zone corresponding to a dilated pupil diameter and the lens is intended to function as a simultaneous vision lens in which the human brain selects the image of most interest at a given time. GB-A-2139375 takes no account of corneal topography either as an optical element or in terms of the impact of tears on the optics of the combined system of lens, tears and cornea even though the geometry proposed would lead to a marked tear lens when worn on a typical human eye. Moreover, this design would require the lens to be accurately positioned on the eye because even small displacements would cause dramatic power changes for the lenswearer.

WO 88/09950 describes an opthalmic lens which obtains a multifocal effect by employing either a plurality of radially differing zones or a non-homogeneous surface. The multiple zones are intended to provide distance, intermediate and near vision in continuously varying gradients across the central optic zone of the lens. The lens is intended to function as a simultaneous vision lens. However, this design takes no account of corneal topography either as an optical element or in terms of the impact of tears on the optics of such a lens. Thus, such a lens would have to position in a stable location in order to provide stability of vision for patients.

WO 95/09377 describes a rigid lens having concentric delineated optical zones in which an elliptical central zone is surrounded by an annulus generated by a hyperbola. However, this lens would need to translate on downgaze to move the line of vision from the central zone to the marginal zone. Thus, the central elliptical zone would provide a very limited simultaneous vision effect in certain instances, depending on the lenswearer's cornea and spectacle correction, but this effect would be unpredictable. The principal reading addition is achieved by the marginal hyperbolic zone, characterising this invention as an alternating bifocal lens. This design is applicable to rigid contact lenses characterised by having a range of back optic zone radii (also known as "base curves") which are used to obtain the fitting alignment of the lens on the eye. A critical limitation of this design is that each base curve is available with a single predetermined configuration of central and marginal optic zones so that the only means of varying the reading addition is to select a different base curve which would normally result in an unsatisfactory lens-cornea relationship. This design takes no account of the influence of either corneal topography or of the cornea as an optical element, both of which would have a significant impact on the optical performance of the proposed lens and would result in anomalous optical and visual performance characteristics when worn by a normal range of patients.

It is therefore an object of the present invention to provide a lens which has a back surface geometry such that, when worn on a specified eye, it acts as a varifocal device whilst still providing a normal lens-cornea relationship.

SUMMARY OF THE INVENTION

According to one aspect of the invention there is therefore provided a rigid contact lens which is designed to act as a varifocal device when worn on a specified eye in which the varifocal functionality is obtained from the geometry of the back surface of the lens.

According to a second aspect of the invention there is provided a rigid contact lens which has a back surface of aspheric geometry such that, when worn on a specified eye, it acts as a varifocal device.

In this context, the term "specified eye" means a specified eye of a lens wearer or potential lens wearer. The spectacle prescription and the central corneal topography of the specified eye may be known or may be determined.

It is preferred that the specified eye forms part of a combined optical system comprising the lens, the cornea of the specified eye and tears formed between the back surface of the lens and the front surface of the cornea. It is also preferred that the aspheric geometry of the back surface of the lens is designed to modify the spherical aberration of the combined optical system so that the optical power of the combined optical system provides distance vision in the paraxial region of the lens and increasing positive power towards the edge of the effective optic zone of the lens.

Preferably, the aspheric geometry of the back surface of the lens is further designed to modify the spherical aberration of the combined optical system so that the optical power of the combined optical system provides the reading addition required for the specified eye within the area of the pupil of the eye in normal light.

As stated above, one aim of the present invention is to provide a varifocal lens in which the geometry of the back surface is such that it provides a normal lens-cornea relationship when the lens is worn. The lens-cornea relationship is determined principally by two parameters:

a) the clearance between the apex of the cornea and the back vertex of the lens when the lens is well-centred on the cornea. This is usually described as the apical tear layer thickness (ATLT); and b) the axial clearance, measured parallel to the lens axis, at the edge of the lens when the lens is well-centred on the cornea. This is usually described as the axial edge clearance (AEC).

The parameters ATLT and AEC are usually measured in microns. Typical values for a normal lens-cornea relationship would be to have an ATLT in the range 12 to 18 microns and an AEC in the range 80 to 100 microns.

As mentioned above, one aspect of this invention is to vary the shape of the back surface of a lens to modify the spherical aberration of the combined optical system of lens, tear layer and cornea to provide distance correction in the paraxial region and near correction in a specified marginal zone. In the preferred case, the non-spherical geometry of the back surface will be defined by a conic section but in some cases the geometry may be better defined by the use of a spline curve or an appropriate polynomial construction.

To define the conic section geometry, the use of the parameter p is preferred to the use of the numerical eccentricity because it simplifies the calculations in cases where it is necessary to use hyperbolic geometries. In such cases, using the numerical eccentricity as the conic parameter would require the use of imaginary numbers. The parameter p is defined by: $p=1-e^2$, where e is the numerical eccentricity. When the conic section is a sphere, $p=1$ and when the section is a parabola, $p=0$.

Ideally, the varifocal lens should obtain its primary varifocal functionality from the back surface of the lens alone. Thus, in the majority of cases, the front surface of the lens will be prepared according to any standard technique for manufacturing contact lenses. However, in extreme cases, where the degree of correction is too great to be provided by the back surface alone, the front surface of the lens may be shaped to provide additional visual correction.

In order to prepare a rigid contact lens as described above which acts as a varifocal device when worn on a specified eye, it is essential to know the patient's spectacle prescription and details of the patient's central corneal topography. Thus, according to another aspect of the invention there is provided a process for the manufacture of a rigid contact lens which, when worn on a specified eye, acts as a varifocal device which comprises determining the spectacle prescription of the lens wearer; obtaining data which defines the central corneal topography of the specified eye; using the prescription and data to construct a model of a target combined optical system comprising a target lens, the cornea of the specified eye and tears formed between the back surface of the lens and the front surface of the cornea, the back surface of the target lens having aspheric geometry which is designed to modify the spherical aberration of the model combined optical system so that the optical power of the model combined optical system provides distance vision in the paraxial region of the lens and increasing positive power towards the edge of the effective optic zone of the target lens; measuring parameters which define the geometry of the back surface of the target lens and using these parameters to generate data to control the action of a shaping device which forms the back surface of the lens according to the defined geometry of the target lens.

According to a further aspect of the invention there is provided a process for shaping the back surface of a rigid contact lens which, when worn on a specified eye, acts as a varifocal device which comprises determining the spectacle prescription of the lens wearer; obtaining data which defines the central corneal topography of the specified eye; using the prescription and data to construct a model of a target combined optical system comprising a target lens, the cornea of the specified eye and tears formed between the back surface of the lens and the front surface of the cornea, the back surface of the target lens having aspheric geometry which is designed to modify the spherical aberration of the model combined optical system so that the optical power of the model combined optical system provides distance vision in the paraxial region of the lens and increasing positive power towards the edge of the effective optic zone of the target lens; measuring parameters which define the geometry of the back surface of the target lens and using these parameters to generate data to control the action of a shaping device which forms the back surface of the lens according to the defined geometry of the target lens.

Preferably, the data which defines the central corneal topography of the specified eye is obtained by means of a videokeratoscope as described above. The spectacle prescription, which is usually referred to as the "spectacle Rx", may be obtained by any optometrist using standard techniques.

Once the spectacle Rx and the corneal measurements are known, it is possible to establish a model of the eye. Preferably, this model of the eye is a computer model, although it is envisaged that it could also be a physical model of the eye.

A model of the combined optical system may then be constructed by fitting a sample rigid lens of known geometry to the model cornea; subjecting the sample model combined optical system thus formed to ray tracing analysis and modifying the back surface of the sample lens to form the model target combined optical system.

In this context, the term "fitting" comprises selecting a sample rigid lens of known geometry and positioning this lens in relation to the model cornea so that it is suitably located for the ray tracing analysis.

It is envisaged that the ray tracing analysis could be performed physically using actual sample lenses and rays of light. However, an accurate ray tracing algorithm has been developed which enables ray tracing to be performed by computer through the three-component optical system comprising the proposed lens, the layer of tears which is normally located between the back surface of the lens and the eye and the model eye.

For the purposes of analysis, the model eye is assumed to be a single optical element having a refractive index of 1.3375. This assumption is normal for analyses of this type and the optical considerations which form the basis for this assumption are well-documented.

Once a satisfactory model of the target combined optical system has been established, certain parameters which define the geometry of the back surface of the target lens may be measured. Preferably, these parameters include the vertex radius and the numerical eccentricity of the central optic zone and the radii of the peripheral zones. However, other parameters of the target lens may also be measured such as the centre thickness, front optic zone diameter, axial edge thickness, front optic zone radius and front peripheral zone radius.

These measured parameters may then be used to generate data which is preferably in the form of a set of instructions capable of being interpreted by a control system of the shaping device. Preferably, the shaping device is a cutting tool, especially a diamond cutting tool, and it is particularly preferred that the shaping device is a computer numerically controlled lathe. Suitable lathes of this type are produced by City Crown Limited of 14 Kempson Close, Aylesbury, Buckinghamshire HP19 3UQ. However, it is also envisaged that the back surface of the lens of the invention could be formed by an alternative process such as moulding.

The invention also provides a rigid contact lens whenever prepared by a process as described above as well as a rigid contact lens blank or button having a back surface prepared by a process as described above. Indeed, it is envisaged that such rigid contact lens blanks or buttons could be provided to contact lens manufacturers who would then form the front surface using standard techniques.

A rigid contact lens as described above for use in the treatment of vision defects, especially presbyopia, is also provided.

DETAILED DESCRIPTION OF THE INVENTION

Figure 1:
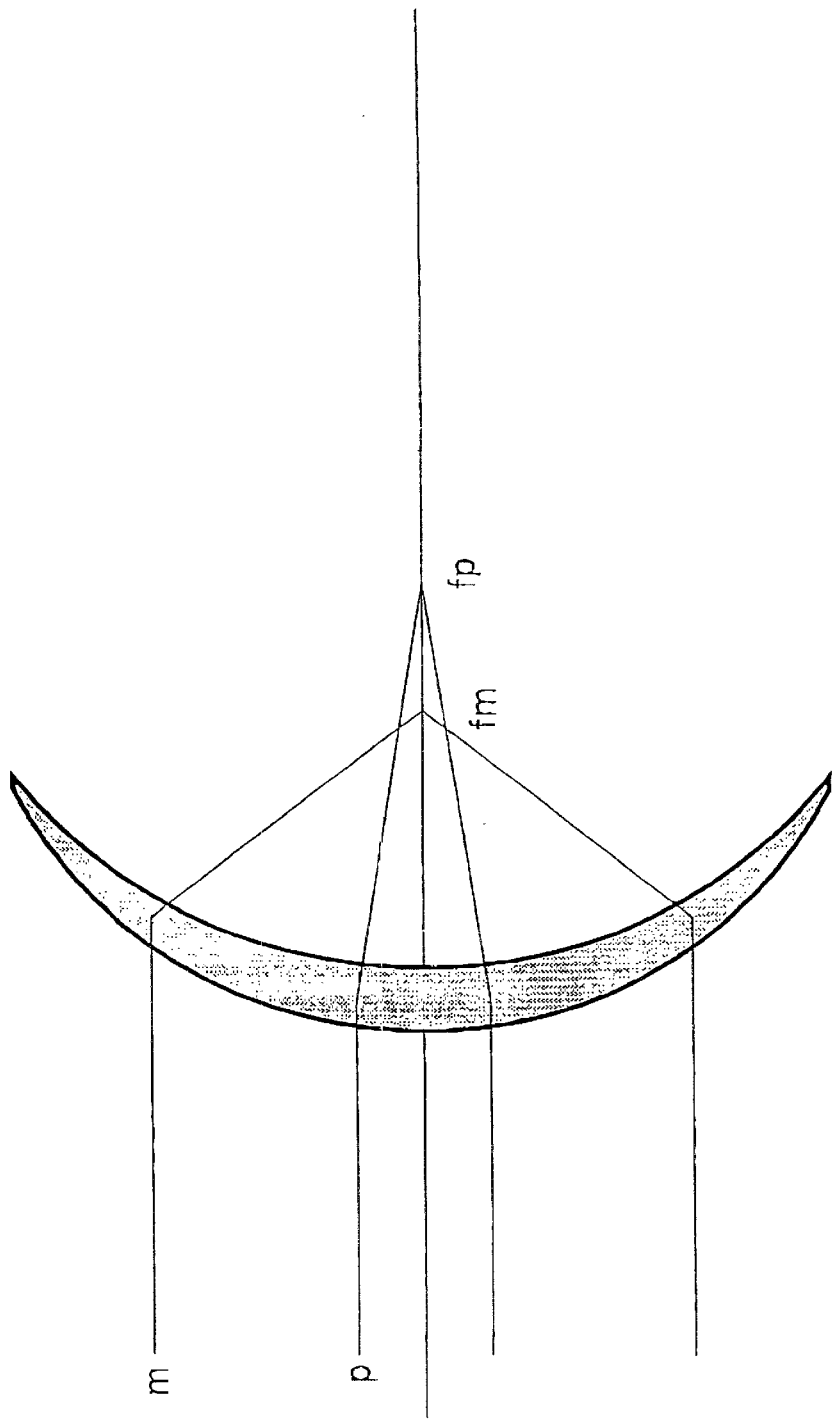
FIG. 1 is a schematic sectional view showing a positively powered lens with incident paraxial and marginal rays in accordance with the prior art.
Figure 2:
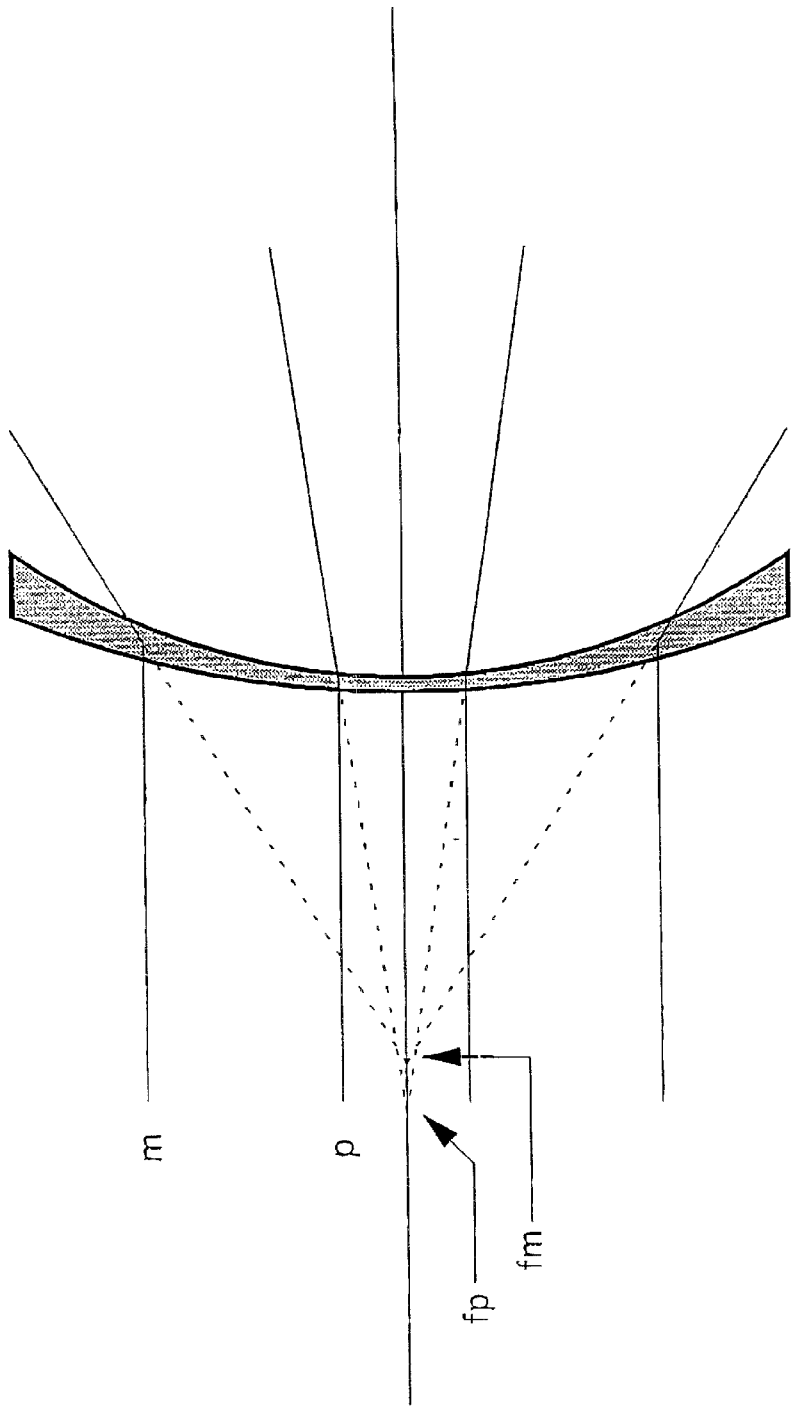
FIG. 2 is a schematic sectional view showing a negatively powered lens with incident paraxial and marginal rays in accordance with the prior art.
Figure 3:
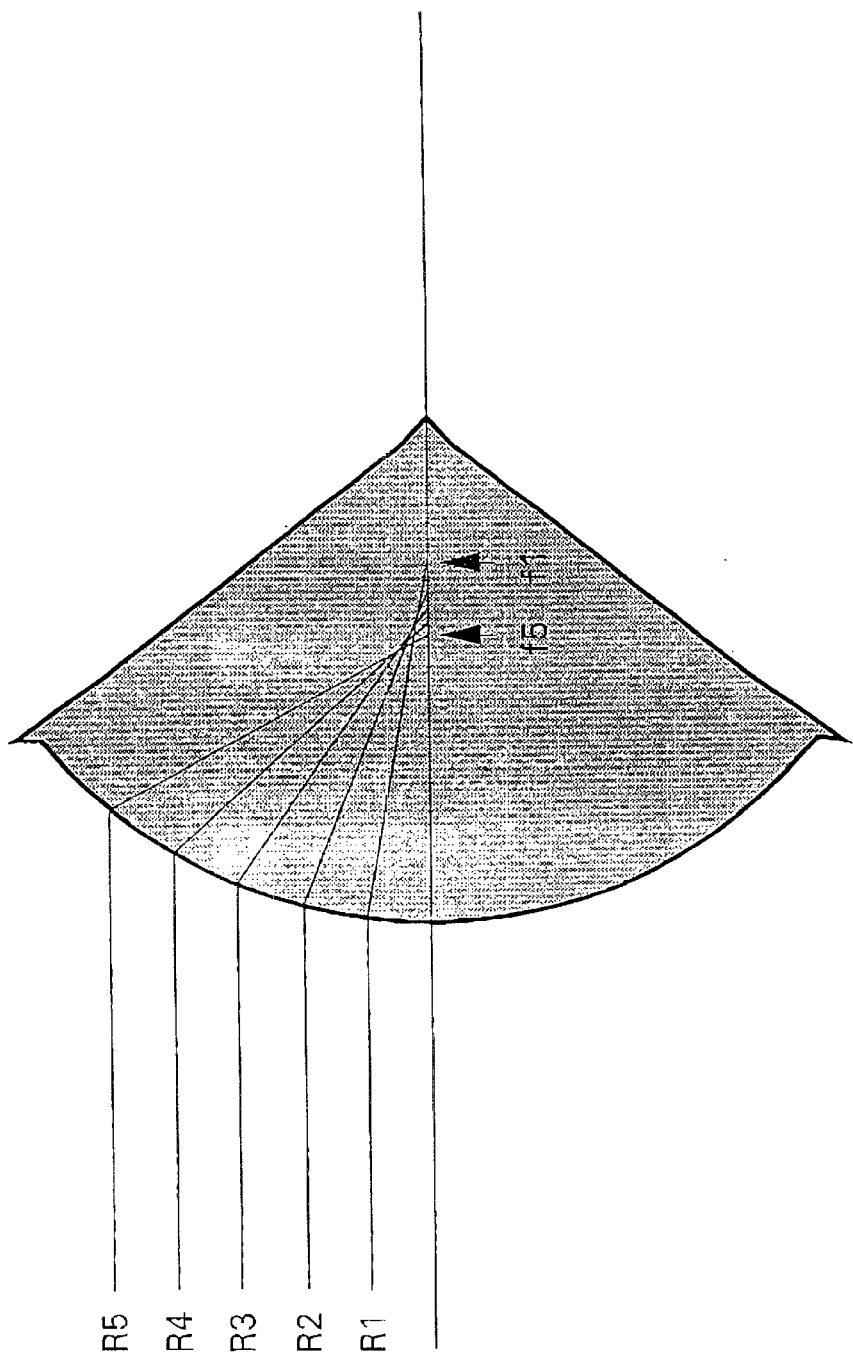
FIG. 3 is a schematic sectional view showing a cornea with incident paraxial and marginal rays in accordance with the prior art.
Figure 4:
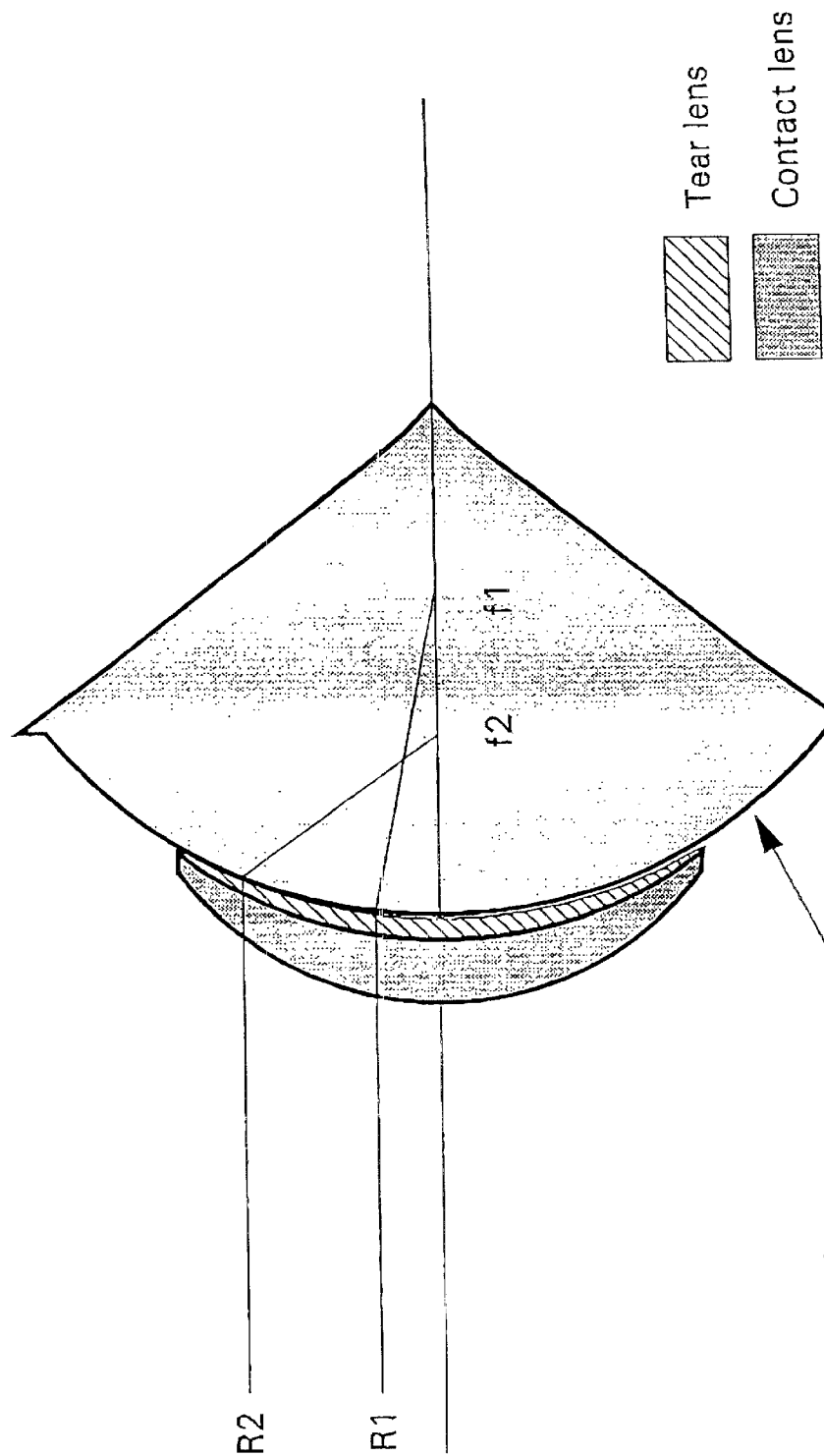
FIG. 4 is a schematic sectional view showing a positively powered contact lens fitted to a cornea and an intermediate tear layer with incident paraxial and marginal rays in accordance with the prior art.

The invention is illustrated further by the following examples in which the cornea is modelled by a general ellipsoid which is specified in terms of its vertex radius and parameter p. In all the examples, the lens material is assumed to have a refractive index of 1.470.

EXAMPLE A

The patient in this example (Patient A) has a cornea with a vertex radius of 7.74 mm and a p-value of 0.7975 (corresponding to a numerical eccentricity of 0.45). Patient A is a myope (short-sighted) requiring a distance correction of −5.75 dioptres and a reading addition of +1.75 dioptres.

The dimensions of Patient A's cornea were determined by the use of a videokeratoscope.

Given Patient A's corneal dimensions, the back surface of the spherical lens defined in Table 1 below will provide a normal lens-cornea relationship, having an apical tear layer thickness of 14 microns and an axial edge clearance of 87 microns. The other lens dimensions are provided for completeness. These dimensions describe a normal spherical lens designed to fit Patient A which would be specified in such a case.

TABLE 1

| Back surface geometry: | |
| --- | --- |
| Radius in mm | Diameter in mm |
| 7.75 | 7.80 |
| 8.35 | 8.90 |
| 10.50 | 9.50 |

| Other lens dimensions: |
| --- |
| Centre thickness = 0.15 mm |
| Front optic zone diameter = 8.00 mm |
| Axial edge thickness = 0.12 mm |
| Front optic zone radius = 8.61 mm |
| Front peripheral zone radius = 7.31 mm |

When the combined optical system comprising Patient A's cornea, the tear layer and the lens specified in Table 1 is subjected to accurate ray tracing analysis, a paraxial ray at a distance of 0.01 mm from the axis will provide a power of −5.80 dioptres. A marginal ray located at a distance of 2.50 mm from the axis will provide a power of −5.84 dioptres. In this case therefore the spherical aberration of the combined lens, tears and cornea has a spherical aberration of −0.04 dioptres at a distance of 2.50 mm from the centre.

The intention is then to modify the back surface geometry of the lens so that the paraxial power of the combined optical system will remain close to −5.75 dioptres to correct the patient's distance vision but such that the marginal power at a distance of 2.50 mm will be approximately +1.75 dioptres more positive so as to provide the necessary reading addition when Patient A looks through this marginal point on gazing down. A further requirement is that the values of the apical tear layer thickness and axial edge clearance will be close to the values of the normally-fitting spherical lens specified in Table 1.

The lens having aspheric back surface geometry specified in Table 2 below meets these requirements.

TABLE 2

| Back surface geometry: | |
| --- | --- |
| Radius, p-value | Diameter |
| 7.45, p = 0.40 | 7.80 |
| 8.35 | 8.90 |
| 10.50 | 9.50 |

| Other lens dimensions: |
| --- |
| Centre thickness = 0.15 mm |
| Front optic zone diameter = 8.00 mm |
| Axial edge thickness = 0.12 mm |
| Front optic zone radius = 8.50 mm |
| Front peripheral zone radius = 7.47 mm |

When applied to Patient A's cornea, the lens specified in Table 2 will provide an apical tear layer thickness of 14 microns and an axial edge clearance of 87 microns.

When subjected to an accurate ray tracing analysis, the combined optical system comprising the lens specified in Table 2, the tear layer and Patient A's cornea, provides paraxial power of −5.75 dioptres at a distance of 0.01 mm from the axis and marginal power of −3.88 dioptres at a distance of 2.50 mm from the centre. In this case, the spherical aberration in the system at a distance of 2.50 mm from the centre is +1.87 dioptres.

EXAMPLE B

The patient in this example (Patient B) has a cornea with a vertex radius of 7.45 mm and a p-value of 0.8556 (corresponding to a numerical eccentricity of 0.38). Patient B is a hyperope (long-sighted) requiring a distance correction of +1.50 dioptres and a reading addition of +1.75 dioptres. The dimensions of Patient B's cornea were determined by the use of a videokeratoscope.

Given Patient B's corneal dimensions, the back surface of the spherical lens defined in Table 3 below will provide a normal lens-cornea relationship, having an apical tear layer thickness of 13 microns and an axial edge clearance of 97 microns. The remaining lens dimensions are again provided for completeness and describe a normal spherical lens designed to fit Patient B which would be specified in such a case.

TABLE 3

| Back surface geometry: | |
| --- | --- |
| Radius in mm | Diameter in mm |
| 7.45 | 7.80 |
| 8.35 | 8.90 |
| 10.00 | 9.50 |

Other lens dimensions:

Centre thickness = 0.20 mm
Front optic zone diameter = 8.00 mm
Axial edge thickness = 0.12 mm
Front optic zone radius = 7.34 mm
Front peripheral zone radius = 8.05 mm When the combined optical system comprising Patient B's cornea, the tear layer and the lens specified in Table 3 is subjected to accurate ray tracing analysis, a paraxial ray at a distance of 0.01 mm from the axis will provide a power of +1.50 dioptres. A marginal ray located at a distance of 2.50 mm from the axis will provide a power of +1.74 dioptres. In this case therefore the spherical aberration of the combined lens, tears and cornea has a spherical aberration of +0.24 dioptres at a distance of 2.50 mm from the centre.

The intention is then as it was for Patient A to modify the back surface geometry of the lens so that the paraxial power of the combined optical system will remain close to +1.50 dioptres to correct the patient's distance vision but such that the marginal power at a distance of 2.50 mm will be approximately +1.75 dioptres more positive so as to provide the necessary reading addition when Patient B looks through this marginal point on gazing down. Again, it is a further requirement that the values of apical tear layer thickness and axial edge clearance will be close to the values of the normally-fitting spherical lens specified in Table 3.

The lens having aspheric back surface geometry specified in Table 4 below meets these requirements.

TABLE 4

| Back surface geometry[1] | |
| --- | --- |
| Radius/p-value | Diameter |
| A: 7.25, p = 0.63 | B: 7.80 |
| C: 8.05 | D: 8.90 |
| E: 10.00 | F: 9.50 |

Other lens dimensions:

G: Center thickness = 0.20 mm
H: Front optic zone diameter = 8.00 mm
Axial edge thickness = 0.12 mm
Front optic zone radius = 7.29 mm
Front peripheral zone radius = 8.18 mm

Figure 5:
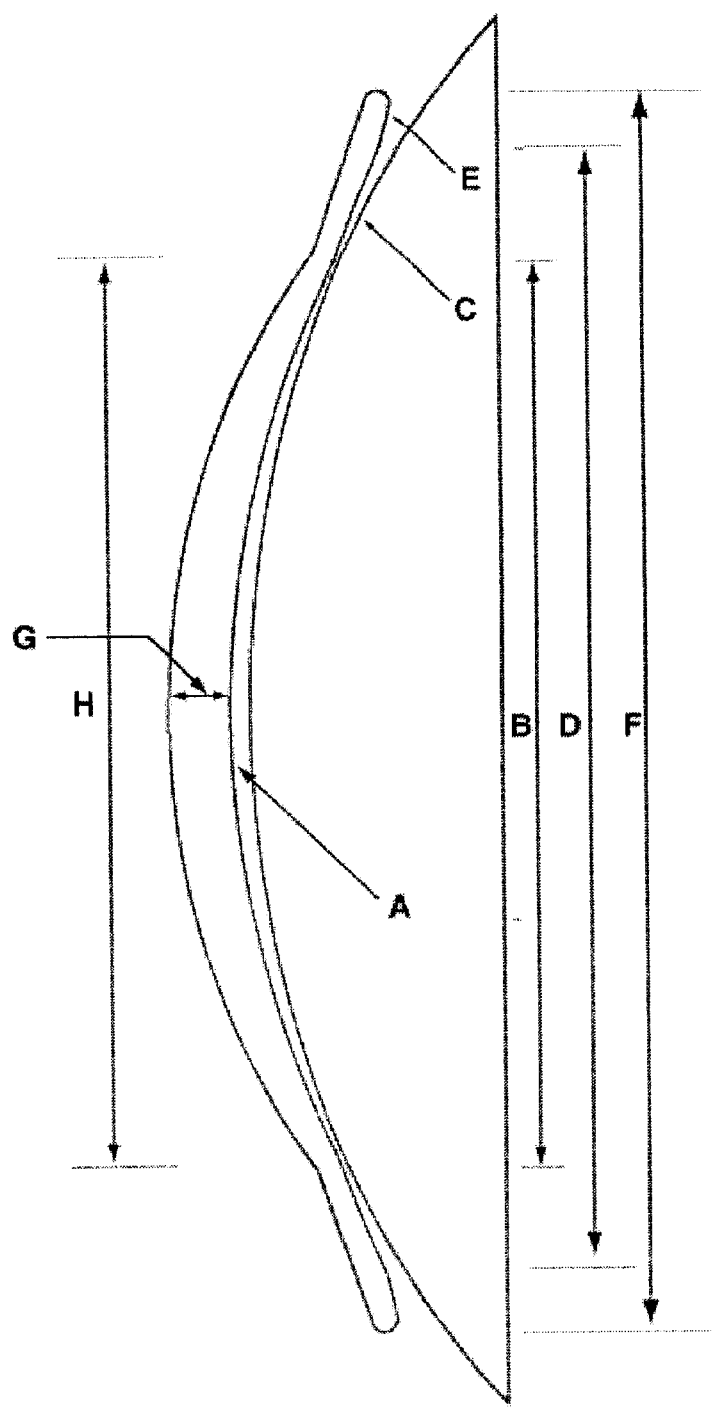
FIG. 5 is a schematic sectional view of a varifocal contact lens in accordance with the invention worn on a cornea of a specified on eye, the lens being shaped as summarized in Table 4 of the specification.

[1]The dimensions/labels are as marked with reference to FIG. 5 of the drawings.

When applied to Patient B's cornea, the lens specified in Table 4 will provide an apical tear layer thickness of 13 microns and an axial edge clearance of 97 microns.

When subjected to an accurate ray tracing analysis, the combined optical system comprising the lens specified in Table 4, the tear layer and Patient B's cornea, provides paraxial power of +1.49 dioptres at a distance of 0.01 mm from the axis and marginal power of +3.51 dioptres at a distance of 2.50 mm from the centre. In this case, the spherical aberration in the system at a distance of 2.50 mm from the centre is +2.02 dioptres.

The dimensions of the lenses specified in Tables 2 and 4, or a selection thereof, which define the shape of the back surface are then provided to a computer numerically controlled lathe which effectively converts the shape of the back surface of the target lens into a mathematical form which can be utilised in machine control software to control the action of the lathe. The lathe is then able to cut the back surface of the lens to produce a smooth, aspherically curved back surface of the required dimensions.

The machine control software will not be described as it is entirely conventional and within the capacity of the skilled man.

EXAMPLE C

Clinical Study

The on-eye performance of the proposed design has been assessed by means of a formal clinical study which was conducted by Eurolens Research Ltd. at UMIST, Manchester, England. The study was approved by the Manchester Health Authority Research Ethics Committee (Ref. CM/97/148).

In this study, 28 subjects wore lenses manufactured according to the process of the invention for a period of three months. The subjects were all presbyopic, ranging in age from 45 to 68 and having spectacle reading additions in the ranges from +0.75 to +2.50.

The results of the study showed that the high contrast LogMAR spectacle acuity at the initial visit had a mean of +0.10±0.12 (which approximates 6/7.5±one Snellen line of acuity) and the acuity at the final visit with the varifocal lenses was +0.12±0.10, which also approximates to 6/7.5±one Snellen line acuity. Clinically and statistically there was no difference between the high contrast acuity found at the initial visit for spectacles and that found for the varifocal contact lenses at the final visit (statistically t=−0.623, p=0.5388).

A similar result was noted for low contrast LogMAR acuity between the spectacle acuity at the initial visit (+0.36±0.15) and that for the varifocal contact lenses at the final visit (+0.38±0.13). The difference between high and low contrast for both spectacles and the varifocal contact lenses was approximately 0.24 which has been shown to be that found for normal subjects.

The results of this study therefore show that the lens provided a quality of vision for distance and near vision correction that was comparable to that found for spectacles. In addition, where needed, intermediate vision, such as in the use of VDUs, was found to be comparable to that obtained with spectacles specifically prescribed for the purpose. Also, no deterioration of vision was recorded by the subjects during conditions of poor lighting, such as driving at night. It was also found that corneal curvature was not significantly affected during lens wear. Moreover, the design did not generate any significant ocular changes that could be graded using a slit lamp biomicroscope.

It should be appreciated that the above examples have been provided by way of illustration only and that modifications of detail may be made within the scope of the invention.

What is claimed is:

1. A process for the manufacture of a rigid contact lens having a front surface and a back surface which, when worn on a specified eye, acts as a varifocal device which comprises determining the spectacle prescription of the lens wearer, obtaining data which defines the central corneal topography of the specified eye, using the prescription and data to construct a model of a target combined optical system comprising a model of a target lens, a model of the cornea of the specified eye and a model of tears formed between the back surface of the lens and the front surface of the model cornea, the back surface of the target lens having aspheric geometry which is designed to modify the spherical aberration of the model combined optical system so that the optical power of the model combined optical system provides distance vision in the paraxial region of the lens and increasing positive power towards the edge of the effective optic zone of the target lens, measuring parameters which define the geometry of the back surface of the target lens, using these parameters to generate data to control the action of a shaping device which forms the back surface of the lens according to the defined geometry of the target lens and preparing the front surface of the lens to complete the manufacture of the contact lens.

2. A process for the manufacture of a rigid contact lens blank which, when worn on a specified eye, acts as a varifocal device which comprises determining the spectacle prescription of the lens wearer, obtaining data which defines the central corneal topography of the specified eye, using the prescription and data to construct a model of a target combined optical system comprising a model of a target lens, a model of the cornea of the specified eye and a model of tears formed between the back surface of the lens and the front surface of the model cornea, the back surface of the target lens having aspheric geometry which is designed to modify the spherical aberration of the model combined optical system so that the optical power of the model combined optical system provides distance vision in the paraxial region of the lens and increasing positive power towards the edge of the effective optic zone of the target lens, measuring parameters which define the geometry of the back surface of the target lens and using these parameters to generate data to control the action of a shaping device which forms the back surface of the lens according to the defined geometry of the target lens.

3. A process according to claim 1 or 2, in which the data which defines the central corneal topography of the specified eye is obtained by means of a videokeratoscope.

4. A process according to claim 1 or 2, in which the model of the combined optical system is constructed by fitting a sample rigid lens of known geometry to the model cornea, subjecting the sample model combined optical system thus formed to ray tracing analysis and modifying the back surface of the sample lens to form the model target combined optical system.

5. A process according to claim 1 or 2, in which the parameters of the back surface of the target lens which are measured comprise the vertex radius and the numerical eccentricity of the central optic zone and radii of the peripheral zones.

6. A process according to claim 1 or 2, in which the data generated from the measured parameters comprises a set of instructions capable of being interpreted by a control system of the shaping device.

7. A process according to claim 1 or 2, in which the shaping device is a cutting tool.

8. A process according to claim 7, in which the cutting tool is a computer numerically controlled lathe.

9. A rigid contact lens prepared in accordance with the process of claim 1.

10. A rigid contact lens blank having a back surface prepared in accordance with the process of claim 2.

11. A method of treating vision defects using a contact lens as set forth in claim 9 or 10, comprising the step of fitting the contact lens to a specified eye to obtain varifocal functionality from the geometry of the back surface of the contact lens.

12. A method of treating vision defects using a contact lens as set forth in claim 10, comprising the step of fitting the contact lens to the specified eye to cause the aspheric geometry of the lens to operate as a verifocal device.

13. A process according to claim 1, wherein the step of preparing the front surface of the lens includes shaping it to provide additional visual correction.

* * * * *